United States Patent
Miller et al.

(10) Patent No.: US 7,039,214 B2
(45) Date of Patent: *May 2, 2006

(54) EMBEDDING WATERMARK COMPONENTS DURING SEPARATE PRINTING STAGES

(75) Inventors: Marc D. Miller, Corte Madera, CA (US); Jonathan L. Hawes, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 457 days.

This patent is subject to a terminal disclaimer.

(21) Appl. No.: 10/172,769

(22) Filed: Jun. 14, 2002

(65) Prior Publication Data
US 2003/0025423 A1    Feb. 6, 2003

Related U.S. Application Data

(63) Continuation-in-part of application No. 10/154,621, filed on May 22, 2002, which is a continuation-in-part of application No. 09/694,465, filed on Oct. 23, 2000, now Pat. No. 6,763,122.

(60) Provisional application No. 60/163,676, filed on Nov. 5, 1999.

(51) Int. Cl.
G06K 9/00 (2006.01)

(52) U.S. Cl. ............... 382/100; 382/135; 382/115; 358/3.28; 235/380

(58) Field of Classification Search ............... 382/100, 382/135, 115; 358/3.25, 3.31, 3.28; 715/500; 713/176; 283/17, 73, 113; 235/494; 380/51, 380/55

See application file for complete search history.

(56) References Cited

U.S. PATENT DOCUMENTS

| 3,569,619 | A | 3/1971 | Simjian |
| 3,665,162 | A | 5/1972 | Yamamoto et al. |
| 3,703,628 | A | 11/1972 | Philipson, Jr. |
| 3,805,238 | A | 4/1974 | Rothfjell |
| 3,838,444 | A | 9/1974 | Loughlin et al. |
| 3,845,391 | A | 10/1974 | Crosby |
| 3,914,877 | A | 10/1975 | Hines |
| 3,922,074 | A | 11/1975 | Ikegami et al. |
| 3,984,624 | A | 10/1976 | Waggener |
| 4,225,967 | A | 9/1980 | Miwa et al. |
| 4,230,990 | A | 10/1980 | Lert, Jr. et al. |
| 4,231,113 | A | 10/1980 | Blasbalg |

(Continued)

FOREIGN PATENT DOCUMENTS

CA    2235002    12/1998

(Continued)

OTHER PUBLICATIONS

Office Action mailed Dec. 22, 2004 in U.S. Appl. No. 10/154,621, 5 pages.

(Continued)

*Primary Examiner*—Barry Choobin
(74) *Attorney, Agent, or Firm*—Digimarc Corporation

(57) ABSTRACT

The present invention relates to embedding a document with multiple watermark components at different printing stages. A document is preprinted to include a first digital watermark component. The document is then reprinted, perhaps with a lower quality printer, to include a second digital watermark component. In some cases the first component provides an orientation signal that is useful when trying to detect the second component. In other cases the first and second components are related or otherwise used to determine the authenticity of the document. In still other cases, the first and second watermark components carry information useful in determining the type of document, watermark-embedding hints and/or personal or serialized data.

30 Claims, 3 Drawing Sheets

U.S. PATENT DOCUMENTS

| | | |
|---|---|---|
| 4,238,849 A | 12/1980 | Gassmann |
| 4,252,995 A | 2/1981 | Schmidt et al. |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,395,600 A | 7/1983 | Lundy et al. |
| 4,423,415 A | 12/1983 | Goldman |
| 4,425,642 A | 1/1984 | Moses et al. |
| 4,476,468 A | 10/1984 | Goldman |
| 4,528,588 A | 7/1985 | Lofberg |
| 4,532,508 A | 7/1985 | Ruell |
| 4,547,804 A | 10/1985 | Greenberg |
| 4,553,261 A | 11/1985 | Froessl |
| 4,590,366 A | 5/1986 | Rothfjell |
| 4,595,950 A | 6/1986 | Lofberg |
| 4,637,051 A | 1/1987 | Clark |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | Causse D'Agraives et al. |
| 4,682,794 A | 7/1987 | Margolin |
| 4,689,477 A | 8/1987 | Goldman |
| 4,703,476 A | 10/1987 | Howard |
| 4,712,103 A | 12/1987 | Gotanda |
| 4,718,106 A | 1/1988 | Weinblatt |
| 4,739,377 A | 4/1988 | Allen |
| 4,750,173 A | 6/1988 | Bluthgen |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,876,617 A | 10/1989 | Best et al. |
| 4,879,747 A | 11/1989 | Leighton et al. |
| 4,884,139 A | 11/1989 | Pommier |
| 4,888,798 A | 12/1989 | Earnest |
| 4,903,301 A | 2/1990 | Kondo et al. |
| 4,908,836 A | 3/1990 | Rushforth et al. |
| 4,908,873 A | 3/1990 | Philibert et al. |
| 4,921,278 A | 5/1990 | Shiang et al. |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,947,028 A | 8/1990 | Gorog |
| 4,963,998 A | 10/1990 | Maufe |
| 4,965,827 A | 10/1990 | McDonald |
| 4,967,273 A | 10/1990 | Greenberg |
| 4,969,041 A | 11/1990 | O'Grady et al. |
| 4,972,471 A | 11/1990 | Gross et al. |
| 4,972,476 A | 11/1990 | Nathans |
| 4,977,594 A | 12/1990 | Shear |
| 4,979,210 A | 12/1990 | Nagata et al. |
| 4,993,068 A | 2/1991 | Piosenka et al. |
| 4,996,530 A | 2/1991 | Hilton |
| 5,005,200 A | 4/1991 | Fischer |
| 5,010,405 A | 4/1991 | Schreiber et al. |
| 5,023,907 A | 6/1991 | Johnson et al. |
| 5,027,401 A | 6/1991 | Soltesz |
| 5,036,513 A | 7/1991 | Greenblatt |
| 5,051,835 A | 9/1991 | Bruehl |
| 5,053,956 A | 10/1991 | Donald |
| 5,063,446 A | 11/1991 | Gibson |
| 5,073,899 A | 12/1991 | Collier et al. |
| 5,079,648 A | 1/1992 | Maufe |
| 5,086,469 A | 2/1992 | Gupta et al. |
| 5,095,196 A | 3/1992 | Miyata |
| 5,103,459 A | 4/1992 | Gilhousen et al. |
| 5,113,445 A | 5/1992 | Wang |
| 5,113,518 A | 5/1992 | Durst et al. |
| 5,138,712 A | 8/1992 | Corbin |
| 5,146,457 A | 9/1992 | Veldhuis et al. |
| 5,148,498 A | 9/1992 | Resnikoff |
| 5,150,409 A | 9/1992 | Elsner |
| 5,161,210 A | 11/1992 | Druyvesteyn et al. |
| 5,166,676 A | 11/1992 | Milheiser |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,212,551 A | 5/1993 | Conanan |
| 5,213,337 A | 5/1993 | Sherman |
| 5,228,056 A | 7/1993 | Schilling |
| 5,237,164 A | 8/1993 | Takada |
| 5,243,423 A | 9/1993 | DeJean et al. |
| 5,245,329 A | 9/1993 | Gokcebay |
| 5,253,078 A | 10/1993 | Balkanski et al. |
| 5,258,998 A | 11/1993 | Koide |
| 5,259,025 A | 11/1993 | Monroe |
| 5,262,860 A | 11/1993 | Fitzpatrick |
| 5,267,334 A | 11/1993 | Normille et al. |
| 5,280,537 A | 1/1994 | Sugiyama et al. |
| 5,284,364 A | 2/1994 | Jain |
| 5,288,976 A | 2/1994 | Citron |
| 5,293,399 A | 3/1994 | Hefti |
| 5,295,203 A | 3/1994 | Krause et al. |
| 5,299,019 A | 3/1994 | Pack et al. |
| 5,305,400 A | 4/1994 | Butera |
| 5,315,098 A | 5/1994 | Tow |
| 5,319,453 A | 6/1994 | Copriviza et al. |
| 5,319,724 A | 6/1994 | Blonstein et al. |
| 5,319,735 A | 6/1994 | Preuss et al. |
| 5,325,167 A | 6/1994 | Melen |
| 5,336,871 A | 8/1994 | Colgate, Jr. |
| 5,337,361 A | 8/1994 | Wang et al. |
| 5,351,302 A | 9/1994 | Leighton et al. |
| 5,379,345 A | 1/1995 | Greenberg |
| 5,384,846 A | 1/1995 | Berson et al. |
| 5,385,371 A | 1/1995 | Izawa |
| 5,394,274 A | 2/1995 | Kahn |
| 5,404,377 A | 4/1995 | Moses |
| 5,408,542 A | 4/1995 | Callahan |
| 5,422,963 A | 6/1995 | Chen et al. |
| 5,422,995 A | 6/1995 | Aoki et al. |
| 5,428,607 A | 6/1995 | Hiller et al. |
| 5,428,731 A | 6/1995 | Powers |
| 5,432,870 A | 7/1995 | Schwartz |
| 5,446,273 A | 8/1995 | Leslie |
| 5,448,053 A | 9/1995 | Rhoads |
| 5,450,490 A | 9/1995 | Jensen et al. |
| 5,463,209 A | 10/1995 | Figh |
| 5,469,506 A | 11/1995 | Berson et al. |
| 5,471,533 A | 11/1995 | Wang et al. |
| 5,473,631 A | 12/1995 | Moses |
| 5,479,168 A | 12/1995 | Johnson et al. |
| 5,493,677 A | 2/1996 | Balogh |
| 5,495,411 A | 2/1996 | Ananda |
| 5,495,581 A | 2/1996 | Tsai |
| 5,496,071 A | 3/1996 | Walsh |
| 5,499,294 A | 3/1996 | Friedman |
| 5,515,081 A | 5/1996 | Vasilik |
| 5,524,933 A | 6/1996 | Kunt et al. |

| | | | | | |
|---|---|---|---|---|---|
| 5,530,751 A | 6/1996 | Morris | 5,857,038 A | 1/1999 | Owada et al. |
| 5,530,759 A | 6/1996 | Braudaway | 5,862,260 A | 1/1999 | Rhoads |
| 5,530,852 A | 6/1996 | Meske, Jr. et al. | 5,864,622 A | 1/1999 | Marcus |
| 5,548,645 A | 8/1996 | Ananda | 5,869,819 A | 2/1999 | Knowles |
| 5,553,143 A | 9/1996 | Ross | 5,871,615 A | 2/1999 | Harris |
| 5,579,479 A | 11/1996 | Plum | 5,872,589 A | 2/1999 | Morales |
| 5,594,226 A | 1/1997 | Steger | 5,875,249 A | 2/1999 | Mintzer et al. |
| 5,594,809 A | 1/1997 | Kopec et al. | 5,892,900 A | 4/1999 | Ginter et al. |
| 5,612,943 A | 3/1997 | Moses et al. | 5,893,101 A | 4/1999 | Balogh |
| 5,613,004 A | 3/1997 | Cooperman et al. | 5,893,910 A | 4/1999 | Martineau |
| 5,617,119 A | 4/1997 | Briggs | 5,900,608 A | 5/1999 | Iida |
| 5,629,980 A | 5/1997 | Stefik | 5,902,353 A | 5/1999 | Reber et al. |
| 5,634,012 A | 5/1997 | Stefik | 5,903,729 A | 5/1999 | Reber et al. |
| 5,636,276 A | 6/1997 | Brugger | 5,905,248 A | 5/1999 | Russell et al. |
| 5,636,292 A | 6/1997 | Rhoads | 5,905,251 A | 5/1999 | Knowles |
| 5,638,443 A | 6/1997 | Stefik | 5,905,800 A | 5/1999 | Moskowitz et al. |
| 5,640,193 A | 6/1997 | Wellner | 5,913,210 A | 6/1999 | Call |
| 5,640,647 A | 6/1997 | Hube | 5,915,027 A | 6/1999 | Cox et al. |
| 5,646,997 A | 7/1997 | Barton | 5,918,213 A | 6/1999 | Bernard et al. |
| 5,646,999 A | 7/1997 | Saito | 5,918,214 A | 6/1999 | Perkowski |
| 5,652,626 A | 7/1997 | Kawakami et al. | 5,920,861 A | 7/1999 | Hall |
| 5,652,714 A | 7/1997 | Peterson | 5,920,878 A | 7/1999 | DeMont |
| 5,657,462 A | 8/1997 | Brouwer | 5,926,822 A | 7/1999 | Garman |
| 5,659,164 A | 8/1997 | Schmid | 5,930,377 A | 7/1999 | Powell et al. |
| 5,659,726 A | 8/1997 | Sandford, II et al. | 5,930,767 A | 7/1999 | Reber et al. |
| 5,663,766 A | 9/1997 | Sizer, II | 5,932,863 A | 8/1999 | Rathus |
| 5,664,018 A | 9/1997 | Leighton | 5,933,829 A | 8/1999 | Durst et al. |
| 5,665,951 A | 9/1997 | Newman et al. | 5,938,726 A | 8/1999 | Reber et al. |
| 5,668,636 A | 9/1997 | Beach et al. | 5,938,727 A | 8/1999 | Ikeda |
| 5,671,277 A | 9/1997 | Ikenoue et al. | 5,939,695 A | 8/1999 | Nelson |
| 5,671,282 A | 9/1997 | Wolff et al. | 5,939,699 A | 8/1999 | Perttunen et al. |
| 5,673,316 A | 9/1997 | Auerbach et al. | 5,940,595 A | 8/1999 | Reber et al. |
| 5,680,223 A | 10/1997 | Cooper et al. | 5,943,422 A | 8/1999 | Van Wie et al. |
| 5,684,885 A | 11/1997 | Cass et al. | 5,949,055 A | 9/1999 | Fleet et al. |
| 5,687,236 A | 11/1997 | Moskowitz et al. | 5,950,173 A | 9/1999 | Perkowski |
| 5,689,620 A | 11/1997 | Kopec et al. | 5,963,916 A | 10/1999 | Kaplan |
| 5,689,623 A | 11/1997 | Pinard | 5,969,324 A | 10/1999 | Reber et al. |
| 5,694,471 A | 12/1997 | Chen et al. | 5,971,277 A | 10/1999 | Cragun et al. |
| 5,706,364 A | 1/1998 | Kopec et al. | 5,974,141 A | 10/1999 | Saito |
| 5,715,403 A | 2/1998 | Stefik | 5,974,548 A | 10/1999 | Adams |
| 5,721,788 A | 2/1998 | Powell et al. | 5,978,773 A | 11/1999 | Hudetz et al. |
| 5,734,119 A | 3/1998 | France | 5,979,757 A | 11/1999 | Tracy et al. |
| 5,734,752 A | 3/1998 | Knox | 5,983,218 A | 11/1999 | Syeda-Mahmood |
| 5,742,845 A | 4/1998 | Wagner | 5,991,876 A | 11/1999 | Johnson |
| 5,745,604 A | 4/1998 | Rhoads | 6,024,287 A | 2/2000 | Takai et al. |
| 5,748,783 A | 5/1998 | Rhoads | 6,052,486 A | 4/2000 | Knowlton et al. |
| 5,760,386 A | 6/1998 | Ward | 6,064,764 A | 5/2000 | Bhaskaran et al. |
| 5,761,686 A | 6/1998 | Bloomberg | 6,076,064 A | 6/2000 | Rose, Jr. |
| 5,765,152 A | 6/1998 | Erickson | 6,101,602 A | 8/2000 | Fridrich |
| 5,765,176 A | 6/1998 | Bloomberg | 6,122,403 A | 9/2000 | Rhoads |
| 5,768,426 A | 6/1998 | Rhoads | 6,131,161 A | 10/2000 | Linnartz |
| 5,774,452 A | 6/1998 | Wolosewicz | 6,138,151 A | 10/2000 | Reber et al. |
| 5,778,102 A | 7/1998 | Sandford, II et al. | 6,157,330 A | 12/2000 | Bruekers et al. |
| 5,786,587 A | 7/1998 | Colgate, Jr. | 6,163,842 A | 12/2000 | Barton |
| 5,790,703 A | 8/1998 | Wang | 6,185,312 B1 | 2/2001 | Nakamura et al. |
| 5,801,687 A | 9/1998 | Peterson | 6,185,316 B1 | 2/2001 | Buffam |
| 5,804,803 A | 9/1998 | Cragun et al. | 6,185,683 B1 | 2/2001 | Ginter et al. |
| 5,809,139 A | 9/1998 | Girod et al. | 6,199,048 B1 | 3/2001 | Hudetz et al. |
| 5,809,317 A | 9/1998 | Kogan | 6,205,249 B1 | 3/2001 | Moskowitz |
| 5,818,441 A | 10/1998 | Throckmorton | 6,216,116 B1 | 4/2001 | Barkan et al. |
| 5,822,436 A | 10/1998 | Rhoads | 6,219,439 B1 | 4/2001 | Burger |
| 5,822,453 A | 10/1998 | Lee et al. | 6,226,387 B1 | 5/2001 | Tewfik et al. |
| 5,822,464 A | 10/1998 | Metcalfe | 6,233,347 B1 | 5/2001 | Chen et al. |
| 5,822,478 A | 10/1998 | Kim | 6,233,684 B1 * | 5/2001 | Stefik et al. ................. 713/176 |
| 5,822,488 A | 10/1998 | Terasawa et al. | 6,243,480 B1 | 6/2001 | Zhao et al. |
| 5,825,892 A | 10/1998 | Braudaway et al. | 6,256,736 B1 | 7/2001 | Coppersmith et al. |
| 5,828,325 A | 10/1998 | Wolosewicz et al. | 6,272,176 B1 | 8/2001 | Srinivasan |
| 5,841,886 A | 11/1998 | Rhoads | 6,285,776 B1 | 9/2001 | Rhoads |
| 5,841,978 A | 11/1998 | Rhoads | 6,286,036 B1 | 9/2001 | Rhoads |
| 5,845,281 A | 12/1998 | Benson | 6,286,761 B1 | 9/2001 | Wen |
| 5,848,413 A | 12/1998 | Wolff | 6,289,108 B1 | 9/2001 | Rhoads |
| 5,848,424 A | 12/1998 | Scheinkman | 6,292,092 B1 | 9/2001 | Chow et al. |
| 5,852,673 A | 12/1998 | Young | 6,311,214 B1 | 10/2001 | Rhoads |

| | | | |
|---|---|---|---|
| 6,314,192 B1 | 11/2001 | Chen et al. | |
| 6,314,457 B1 | 11/2001 | Schena et al. | |
| 6,321,981 B1 | 11/2001 | Ray et al. | |
| 6,324,573 B1 | 11/2001 | Rhoads | |
| 6,325,420 B1 | 12/2001 | Zhang et al. | |
| 6,332,031 B1 | 12/2001 | Rhoads et al. | |
| 6,332,149 B1 | 12/2001 | Warmus et al. | |
| 6,332,194 B1 | 12/2001 | Bloom et al. | |
| 6,334,187 B1 | 12/2001 | Kadono | |
| 6,334,721 B1 | 1/2002 | Horigane | |
| 6,343,138 B1 | 1/2002 | Rhoads | |
| 6,354,630 B1 | 3/2002 | Zhang et al. | |
| 6,385,330 B1 | 5/2002 | Powell et al. | |
| 6,389,151 B1 | 5/2002 | Carr et al. | |
| 6,408,082 B1 | 6/2002 | Rhoads et al. | |
| 6,424,725 B1 | 7/2002 | Rhoads et al. | |
| 6,427,020 B1 | 7/2002 | Rhoads | |
| 6,456,726 B1 | 9/2002 | Yu et al. | |
| 6,487,301 B1 | 11/2002 | Zhao | |
| 6,522,770 B1 | 2/2003 | Seder et al. | |
| 6,580,819 B1 | 6/2003 | Rhoads | |
| 6,614,914 B1 | 9/2003 | Rhoads et al. | |
| 6,763,122 B1 | 7/2004 | Rodriguez et al. | |
| 6,830,188 B1 * | 12/2004 | Rathus et al. | 235/462.15 |
| 6,922,294 B1 * | 7/2005 | Pierson et al. | 359/819 |
| 6,930,759 B1 * | 8/2005 | Roddy et al. | 355/67 |
| 2001/0001854 A1 | 5/2001 | Schena et al. | |
| 2001/0005837 A1 | 6/2001 | Kojo | |
| 2001/0006585 A1 | 7/2001 | Horigane | |
| 2001/0007975 A1 | 7/2001 | Nyberg, Jr. et al. | |
| 2001/0008557 A1 * | 7/2001 | Stefik et al. | 380/202 |
| 2001/0017717 A1 | 8/2001 | Ishida et al. | |
| 2001/0021144 A1 | 9/2001 | Oshima et al. | |
| 2001/0023421 A1 | 9/2001 | Numao et al. | |
| 2001/0024510 A1 | 9/2001 | Iwamura | |
| 2001/0026377 A1 | 10/2001 | Ikegami | |
| 2001/0026629 A1 | 10/2001 | Oki | |
| 2001/0028727 A1 | 10/2001 | Naito | |
| 2001/0037309 A1 | 11/2001 | Vrain | |
| 2001/0037313 A1 | 11/2001 | Lofgren et al. | |
| 2001/0037455 A1 | 11/2001 | Lawandy et al. | |
| 2001/0040980 A1 | 11/2001 | Yamaguchi | |
| 2001/0047426 A1 | 11/2001 | Hunter | |
| 2001/0047478 A1 | 11/2001 | Mase | |
| 2001/0051964 A1 * | 12/2001 | Warmus et al. | 707/530 |
| 2001/0051996 A1 | 12/2001 | Cooper | |
| 2001/0052076 A1 | 12/2001 | Kadono | |
| 2001/0053235 A1 | 12/2001 | Sato | |
| 2001/0053299 A1 | 12/2001 | Matsunoshita et al. | |
| 2001/0054149 A1 | 12/2001 | Kawaguchi et al. | |
| 2001/0056468 A1 | 12/2001 | Okayasu et al. | |
| 2002/0012446 A1 | 1/2002 | Tanaka | |
| 2002/0018228 A1 | 2/2002 | Torigoe | |
| 2002/0023218 A1 | 2/2002 | Lawandy et al. | |
| 2002/0032864 A1 | 3/2002 | Rhoads et al. | |
| 2002/0037093 A1 | 3/2002 | Murphy | |
| 2002/0051162 A1 | 5/2002 | Kawaguchi et al. | |
| 2002/0056041 A1 | 5/2002 | Moskowitz | |
| 2002/0061120 A1 * | 5/2002 | Carr et al. | 382/100 |
| 2002/0062442 A1 | 5/2002 | Kurahashi | |
| 2002/0072989 A1 | 6/2002 | Van De Sluis | |
| 2002/0077983 A1 | 6/2002 | Tagashira | |
| 2002/0080271 A1 | 6/2002 | Eveleens et al. | |
| 2002/0080994 A1 | 6/2002 | Lofgren et al. | |
| 2002/0097891 A1 | 7/2002 | Hinishi | |
| 2002/0114013 A1 | 8/2002 | Hyakutake et al. | |
| 2002/0126869 A1 * | 9/2002 | Wang et al. | 382/100 |
| 2002/0126872 A1 | 9/2002 | Brunk et al. | |
| 2002/0145759 A1 * | 10/2002 | Miller | 358/3.28 |
| 2002/0168087 A1 | 11/2002 | Petrovic | |
| 2002/0170966 A1 * | 11/2002 | Hannigan et al. | 235/462.01 |
| 2003/0025423 A1 | 2/2003 | Miller et al. | |
| 2003/0040957 A1 | 2/2003 | Rhoads et al. | |
| 2003/0050961 A1 * | 3/2003 | Rhoads et al. | |
| 2003/0056104 A1 * | 3/2003 | Carr et al. | 713/176 |
| 2003/0105950 A1 * | 6/2003 | Hirano et al. | 713/176 |
| 2003/0138128 A1 * | 7/2003 | Rhoads | 382/100 |
| 2003/0150922 A1 * | 8/2003 | Hawes | 235/494 |
| 2004/0057581 A1 * | 3/2004 | Rhoads | 380/59 |
| 2004/0141207 A1 * | 7/2004 | Warmus et al. | 358/1.18 |
| 2004/0153649 A1 * | 8/2004 | Rhoads et al. | 713/176 |
| 2004/0218799 A1 * | 11/2004 | Mastie et al. | 382/137 |
| 2005/0063742 A1 * | 3/2005 | Roddy et al. | 399/311 |
| 2005/0258247 A1 * | 11/2005 | Hawes | 235/454 |

FOREIGN PATENT DOCUMENTS

| | | |
|---|---|---|
| DE | 2943436 | 5/1971 |
| DE | 3806411 | 9/1989 |
| EP | 058 482 | 8/1982 |
| EP | 372 601 | 6/1990 |
| EP | 411 232 | 2/1991 |
| EP | 441 702 | 8/1991 |
| EP | 493 091 | 7/1992 |
| EP | 581 317 | 2/1994 |
| EP | 629 972 | 12/1994 |
| EP | 650146 | 4/1995 |
| EP | 705 025 A2 | 4/1996 |
| EP | 642 060 B1 | 4/1999 |
| EP | 1117246 | 7/2001 |
| EP | 1134710 | 9/2001 |
| EP | 1152592 | 11/2001 |
| EP | 1173001 | 1/2002 |
| GB | 2063018 | 5/1981 |
| GB | 2067871 | 7/1981 |
| GB | 2196167 | 4/1988 |
| GB | 2204984 | 11/1988 |
| GB | 2325765 | 12/1998 |
| JP | 3185585 | 8/1991 |
| JP | 4-248771 | 9/1992 |
| JP | 7115474 | 5/1995 |
| JP | 8050598 | 2/1996 |
| JP | 10171758 | 6/1998 |
| JP | 10177613 | 6/1998 |
| WO | WO. 89/08915 | 9/1989 |
| WO | WO. 94/27228 | 11/1994 |
| WO | WO. 95/10835 | 4/1995 |
| WO | WO. 95/14289 | 5/1995 |
| WO | WO. 95/20291 | 7/1995 |
| WO | WO. 96/26494 | 8/1996 |
| WO | WO. 96/27259 | 9/1996 |
| WO | WO. 96/36163 | 11/1996 |
| WO | WO. 97/43736 | 11/1997 |
| WO | WO. 98/14887 | 4/1998 |
| WO | WO. 98/20642 | 5/1998 |
| WO | WO. 98/24050 | 6/1998 |
| WO | WO. 98/48023 | 9/1998 |
| WO | WO. 98/49813 | 11/1998 |
| WO | WO. 99/34277 | 7/1999 |
| WO | WO0105075 | 1/2001 |
| WO | WO. 01/08405 | 2/2001 |
| WO | WO. 01/43080 | 6/2001 |
| WO | WO. 01/75629 | 10/2001 |
| WO | WO. 01/97175 | 12/2001 |
| WO | WO0197128 | 12/2001 |
| WO | WO. 02/03328 | 1/2002 |
| WO | WO. 02/25599 | 3/2002 |
| WO | WO. 02/27618 | 4/2002 |
| WO | WO. 02/27720 | 4/2002 |
| WO | WO02056264 | 7/2002 |

OTHER PUBLICATIONS

U.S. Appl. No. 60/163,676, filed Nov. 5, 1999, Miller et al.
U.S. Appl. No. 60/000,442, filed Jun. 20, 1995, Hudetz.
U.S. Appl. No. 60/082,228, filed Apr. 16, 1998, Rhoads.
U.S. Appl. No. 60/158,015, filed Oct. 6, 1999, Davis et al.

U.S. Appl. No. 60/356,881, filed Feb. 12, 2002, Hannigan et al.
U.S. Appl. No. 09/342,688, filed Jun. 29, 1999, Rodriguez et al.
U.S. Appl. No. 09/343,104, filed Jun. 29, 1999, Rodriguez et al.
U.S. Appl. No. 09/452,022, filed Nov. 30, 1999, Alattar et al.
U.S. Appl. No. 09/503,881, filed Feb. 14, 2000, Rhoads et al.
U.S. Appl. No. 09/531,076, filed Mar. 18, 2000, Rhoads et al.
U.S. Appl. No. 09/547,664, filed Apr. 12, 2000, Rhoads et al.
U.S. Appl. No. 09/562,517, filed May 1, 2000, Davis et al.
U.S. Appl. No. 09/571,422, filed May 15, 2000, Rhoads et al.
U.S. Appl. No. 09/631,409, filed Aug. 3, 2000, Brundage et al.
U.S. Appl. No. 09/679,261, filed Oct. 4, 2000, Davis et al.
U.S. Appl. No. 09/858,189, filed May 14, 2001, Rhoads et al.
"Access Control and COpyright Protection for Images, Conditional Access and Copyright Protection Based on the Use of Trusted Third Parties," 1995, 43 pages.
"Access Control and Copyright Protection for Images, WorkPackage 8: Watermarking," Jun. 30, 1995, 46 pages.
"Access Control and COpyright Protection for Images, WorkPackage 1: Access Control and Copyright Protection for Images Need Evaluation," Jun., 1995, 21 pages.
Amano, "A Feature Calibration Method for Watermarking of Document Images," Proc. 5$^{th}$ Int. Conf. on Document Analysis and Recognition, Sep., 1999, pp. 91-94.
Arachelian, "White Noise Storm," Apr. 11, 1994, Internet reference, 13 pages.
Arthur, "Digital Fingerprints Protect Artwork," New Scientist, Nov. 12, 1994, p. 24.
Battiato et al., "Robust Watermarking for Images Based on Color Manipulation," Third Int. Image Hiding Workshop, 1999, pp. 302-317.
Bender et al., "Techniques for Data Hiding," Massachusetts Institute of Technology, Media Laboratory, Jan. 1995, 10 pages.
Bloomberg, "Embedding Digital Data on Paper in Iconic Text" SPIE vol. 3027, Document Recognition IV, pp. 67-80 (1997).
Boland et al, "Watermarking Digital Images for Copyright Protection," Fifth International Conference on Image Processing and its Applications, Conference Date Jul. 4-6, 1995, Conf. Publ. No. 410, pp. 326-330.
Boneh, "Collusion-Secure Fingerprinting for Digital Data," Department of Computer Science, Princeton University, 1995, 31 pages.
Bovik, "Handbook of Image and Video Processing," Academic Press, 2000, pp. 133-136, 154, 155.
Brassil et al., Electronic Marking and Identification Techniques to Discourage Document Copying, Proceedings of INFOCOM '94 Conference on Computer, IEEE Commun. Soc. Conference, Jun. 12-16, 1994, 1278-1287.
Brown, "S-Tools for Windows, Version 1.00, .COPYRGHT. 1994 Andy Brown, What is Steganography," Internet reference, Mar. 6, 1994, 6 pages.
Bruckstein, A.M.; Richardson, T.J., A holographic transform domain image watermarking method, Circuits, Systems, and Signal Processing vol. 17, No. 3 p. 361-89, 1998. This paper includes an appendix containing an internal memo of Bell Labs, which according to the authors of the paper, was dated Sep. 1994.

Caronni, "Assuring Ownership Rights for Digital Images," Published in the Proceedings of Reliable It Systems, vis '95, HH. Bruggermann and W. Gerhardt-Hackl (Ed.), Vieweg Publishing Company, Germany, 1995, Jun. 14, 1994, 10 pages.
Choudhury, et al., "Copyright Protection for Electronic Publishing over Computer Networks," IEEE Network Magazine, Jun. 1994, 18 pages.
Clarke, "Invisible Code Tags Electronic Images," Electronic Engineering Times, Jun. 12, 1995, n. 852, p. 42.
Collins et al., "Using Bar Code—Why It's Taking Over", Second Edition, Data Capture Institute, 1990 (Contents & Index).
"Copyright Protection for Digital Images, Digital Fingerprinting from FBI," Highwater FBI brochure, 1995, 4 pages.
"Cyphertech Systems: Introduces Digital Encoding Device to Prevent TV Piracy," Hollywood Reporter, Oct. 20, 1993, p. 23.
Dautzenberg, "Watermarking Images," Department of Microelectronics and Electrical Engineering, Trinity College Dublin, 47 pages, Oct. 1994.
de Castro et al., "Registration of Translated and Rotated Images Using Finite Fourier Transforms," IEEE Transactions on Pattern Analysis and Machine Intelligence, vol. PAMI-9, No. 5, Sep. 1987, pp. 700-703.
Dittman, et al., "Hologram Watermarks for Document Authentications," pp. 60-64, Int. Conference on Information Technology: Coding and Computing (ITCC 2001).
Fitzgerald, "Invisible Digital Copyright ID," Editor & Publisher, Jun. 25, 1994, p. 62.
Fleet et al., "Embedding Invisible Information in Color Images," IEEE Int. Conf. on Image Proc., Oct. 1997, vol. 1, pp. 532-535.
"Folling Card Forgers With Magnetic 'Noise,'" Wall Street Journal, Feb. 8, 1994.
Friedman, "The Trustworthy Digital Camera: Restoring Credibility to the Photographic Image," IEEE Transactions on Consumer Electronics, vol. 39, No. 4, Nov., 1993, pp. 905-910.
Grieco, Jr. et al., "Behind Bars—Bar Coding Principles and Applications", PT Publication, Inc., 1989 (Table of Contents & Index).
Hecht, "Embedded Data Glyph Technology for Hardcopy Digital Documents," SPIE vol. 2171, Feb. 1994, pp. 341-352.
"High Water FBI Limited Presentation Image Copyright Protection Software," FBI Ltd brochure, Jul., 1995, 17 pages.
Jack, "Color Spaces," Video Demystified, A Handbook for the Digital Engineer, 2d ed., Jul., 1995, pp. 39-63.
Johnson, et al., "Bridging the Paper and Electronic Worlds: The Paper User Interface", Interchi '93, pp. 507-512, Apr. 1993.
JPEG Group's JPEG Software (release 4), ftp.csua.berekeley.edu/pub/cypherpunks/applications/jsteg/jpeg.announcement.gz, Jun. 7, 1993, 2 pages.
Kassam, Signal Detection in Non-Gaussian Noise, Dowden & Culver, 1988, pp. 1-96.
Kawaguchi et al. "Principle and Applications of BPCS-Steganography" Proc. SPIE vol. 3528: Multimedia Systems and Applications Nov. 2-4, 1998 pp. 464-473.
Knox, "Digital Watermarks Using Stochastic Screens," SPIE, vol. 3018, Apr., 1997, pp. 316-322.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20-22, 1995, 4 pages.

Komatsu et al. "A Proposal on Digital Watermarking in Document Image Communication and Its Application to Realizing a Signature" Electronics and Communications in Japan Part I vol. 73 No. 5 1990 pp. 22-23.

Komatsu et al. "Authentication System Using Concealed Image In Telematics" Memoirs of the School of Science & Engineering Waseda Univ. No. 52 1988 pp. 45-60.

Kurak et al., "A Cautionary Note On Image Downgrading," 1992 IEEE, pp. 153-159.

Luc, "Analysis of Spread Spectrum System Parameters for Design of Hidden Transmission," Radioengineering, vol. 4, No. 2, Jun. 1995, pp. 26-29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944-957.

Matsui et al., "Video-Steganography: How to Secretly Embed a Signature In a Picture," IMA Intellectual Property Project Proceedings, Jan. 1994, vol. 1, Issue 1, pp. 187-205.

Matthews, "When Seeing is Not Believing," New Scientist, Oct. 16, 1993, pp. 13-15.

Mintzer et al., "Safeguarding Digital library Contents and Users" Digital Watermarking, D-Lib Magazine, Dec. 1997: ISSN 1082-9873.

Moller, et al., "Rechnergestutzte Steganographie: Wie sie Funktioniert und warum folglich jede Reglementierung von Verschlusselung unsinnig ist," DuD, Datenschutz und Datensicherung, 18/6 (1994) 318-326.

"NAB—Cyphertech Starts Anti-Piracy Broadcast Tests," Newsbytes, NEW03230023, Mar. 23, 1994.

Nakamura et al., "A Unified Coding Method of Dithered Image and Text Data Using Micropatterns," Electronics and Communications in Japan, Part 1, vol. 72, No. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Newman, William, et al. "A Desk Supporting Computer-Based Interaction with paper Documents," ACM Conference on Human Factors in Computing Systems (CHI '92) May 3-7, 1992, pp. 587-592.

Palmer, "The Bar Code Book", Third Edition, Helmers Publishing, Inc., 1995 (Contents & Index).

Peairs, "Iconic Paper," Proceedings of the Third International Conference on Document Analysis and Recognition (ICDAR '95), pp. 1174-1179, 1995.

Pennebaker et al., JPEG Still Image Data Compression Standard, Chapter 3, "Aspects of the Human Visual System," pp. 23-27, 1993, Van Nostrand Reinhold, New York.

Pitas et al., "Applying Signatures on Digital Images," IEEE Workshop on Nonlinear Image and Signal Processing, Neos Marmaras, Greece, pp. 460-463, Jun., 1995.

Port, "Halting Highway Robbery on the Internet," Business Week, Oct. 17, 1994, p. 212.

Rao, et al. "Protofoil: Storing and Finding the Information Worker's Paper Documents in an Electronic File Cabinet," Human Factors in Computing Systems (CHI '94), pp. 180-186, Boston, MA, Apr. 1994.

Rindfrey, "Towards and Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Sandford II, et al., "The Data Embedding Method," SPIE vol. 2615, Oct. 23, 1995, pp. 226-259.

Sapwater et al., "Electronic Copyright Protection," PHOTO>Electronic Imaging, vol. 37, No. 6, 1994, pp. 16-21.

Schneier, "Digital Signatures, Cryptographic Algorithms Can Create Nonforgeable Signatures for Electronic Documents, Making Them Valid Legal Instruments" BYTE, Nov. 1993, pp. 309-312.

Seybold, "Holographic signatures for digital images," *The Seybold Report on Desktop Publishing*, Aug. 1995, one page.

shaggy@phantom.com, "Hide and Seek v. 4.0," Internet reference, Apr. 10, 1994, 3 pages.

Sheng et al., "Experiments on Pattern Recognition Using Invariant Fourier-Mellin Descriptors," Journal of Optical Society of America, vol. 3, No. 6, Jun., 1986, pp. 771-776.

Short, "Steps Toward Unmasking Secure Communications," International Journal of Bifurcation and Chaos, vol. 4, No. 4, 1994, pp. 959-977.

Simmons, "Subliminal Channels; Past and Present," ETT, vol. 5, No. 4, Jul.-Aug. 1994, pp. 45-59.

Szepanski, "Additive Binary Data Transmission for Video Signals," Papers Presented at Conf. Of Comm. Engineering Soc. Sep. 30-Oct. 3, 1980, Technical Reports vol. 74, pp. 342-352.

Szepanski "A Signal Theoretic Method For Creating Forgery-Proof Documents For Automatic Verification" 1979 Camahan Conference on Crime Countermeasures University of Kentucky Lexington Kentucky May 16-18, 1979.

Tanaka et al., "A Visual Retrieval System with Private Information for Image Database," Proceeding International Conference on DSP Applications and Technology, Oct. 1991, pp. 415-421.

Tanaka et al., "Embedding Secret Information Into a Dithered Multi-Level Image," Proc. IEEE Military Comm. Conf., Sep. 1990, pp. 216-220.

Tanaka et al., "New Integrated Coding Schemes for Computer-Aided Facsimile," Proc. IEEE Int'l Conf. on Sys. Integration, Apr. 1990, pp. 275-281.

Tanaka, "Embedding the Attribute Information Into a Dithered Image," Systems and Computers in Japan, vol. 21, No. 7, 1990, pp. 43-50.

Tirkel et al, "Electronic Water Mark," DICTA-93, Macquarie University, Sydney, Australia, Dec., 1993, pp. 666-673.

Toga et al., "Registration Revisited," Journal of Neuroscience Methods, 48 (1993), pp. 1-13.

van Schyndel et al., "A Digital Watermark," IEEE International Conference on Image Processing, Nov. 13-16, 1994, pp. 86-90.

Vidal et al., Non-Noticeable Information Embedding in Color Images: Marking and Detection, 1999 IEEE, pp. 293-297.

Vielhauer, et al., "Approaches to Biometric watermarks for owner auethentification," Security and Watermarking of Multimedia Contents III, Ping Wah Wong, Edward J. Delp III, Editors, Proceedings of SPIE vol. 4314 (2001).

Wagner, "Fingerprinting," 1983, pp. 18-22.

Walton, "Image Authentication for a Slippery New Age," Dr. Dobb's Journal, Apr. 1995, pp. 18-26, 82-87.

Weber et al., "Correlative Image Registration," Seminars In Nuclear Medicine, vol. XXIV, No. 4, Oct. 1994, pp. 311-323.

Whittaker, et al., "Back to the Future: Pen and Paper Technology Supports Complex Group Coordination," CHI '95, Conference on Human Factors in Computing Systems, Denver, Colorado (May 7-11, 1995) (text copy obtained from ACM).

* cited by examiner

EMBEDDING WATERMARK COMPONENTS DURING SEPARATE PRINTING STAGES

RELATED APPLICATION DATA

The present application is a continuation in part of U.S. patent application Ser. No. 10/154,621, filed May 22, 2002 (published as U.S. Published Patent Application No. U.S. 2002-0145759 A1). The 10/154,621 application is a continuation in part of application Ser. No. 09/694,465, filed Oct. 23, 2000 (now U.S. Pat. No. 6,763,122), which claims the benefit of provisional application 60/163,676, filed Nov. 5, 1999.

The present invention also relates to assignee's U.S. Pat. No. 6,332,031 (issued on Dec. 18, 2001).

Each of the above-mentioned patent documents is herein incorporated by reference.

TECHNICAL FIELD

The present invention relates to steganography and digital watermarking.

BACKGROUND AND SUMMARY

Digital watermarking technology, a form of steganography, encompasses a great variety of techniques by which plural bits of digital data are hidden in some other object, preferably without leaving human-apparent evidence of alteration.

Digital watermarking may be used to modify content to embed a machine-readable code into the media content. The content may be modified such that the embedded code is imperceptible or nearly imperceptible to the user, yet may be detected through an automated detection process.

Digital watermarking systems typically have two primary components: an embedding component that embeds the watermark in the media content, and a reading component that detects and reads the embedded watermark. The embedding component embeds a watermark pattern, e.g., by altering or adding data samples of the media content. The reading component analyzes content to detect whether a watermark pattern is present. In applications where the watermark encodes information, the reading component extracts this information from the detected watermark. Assignee's U.S. patent application Ser. No. 09/503,881, filed Feb. 14, 2000 (now U.S. Pat. No. 6,614,914), discloses various encoding and decoding techniques. U.S. Pat. Nos. 5,862,260 and 6,122,403 disclose still others. Each of these U.S. patent documents is herein incorporated by reference.

While a digital watermark is typically applied to digital content, it may be implemented so as to remain with the content even through transformations to and from the analog domain. In addition to images, watermarking applies to a variety of different media types, including audio and video. Watermarking can also be applied to ordinary media, whether or not it conveys information. Examples include paper, plastics, laminates, product labels and packaging, paper/film emulsions, etc. A watermark can embed a single bit of information, or any number of bits, line an identifier or payload.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. The surface texture of an object may be altered to create a watermark pattern. This may be accomplished by manufacturing an object in a manner that creates a textured surface or by applying material to the surface (e.g., an invisible film or ink) in a subsequent process. Watermarks can also be optically implemented in holograms and conventional paper watermarks.

One aspect of the present invention links documents through digital watermarking. A first document includes a first identifier embedded as a first digital watermark component. The first digital watermark is decoded to obtain the first identifier. The first identifier is altered to provide a second identifier. The second identifier and the first identifier, however, remain related. The second digital watermark is embedded in a second document as a component of a second digital watermark. The second identifier can be extracted from the second document.

Another aspect of the present invention focuses on documents that are subjected to multiple printing stages. A first digital watermark component is embedded during a first printing stage, and a second digital watermark component is embedded during a later printing stage.

Further features and advantages will become even more apparent with reference to the following detailed description and accompanying drawings.

DETAILED DESCRIPTION

Linking Documents with Digital Watermarks

Documents can be linked together, and to a bearer/creator, through secure indicia on an identification document and subsequently issued documents.

An individual (hereafter "bearer") possesses an identification document. The identification document may include a driver's license, passport, government issued identification document, security badge, etc., etc. The identification document preferably includes a photographic and/or a biometric representation of the bearer of the identification document. The biometric representation may include a fingerprint, retinal scan, voice print, facial recognition map, DNA coding, etc. The biometric representation may be printed or embedded in the identification document (e.g., encoded in a 2-D barcode or embedded as a digital watermark) or stored in electronic memory circuitry (as is provided by a so-called Smart Card). The photographic and/or biometric representation offers a layer of security, as it can be checked against the document bearer.

A digital watermark is embedded in the identification document. The digital watermark includes an identifier (or payload).

Figure 1:
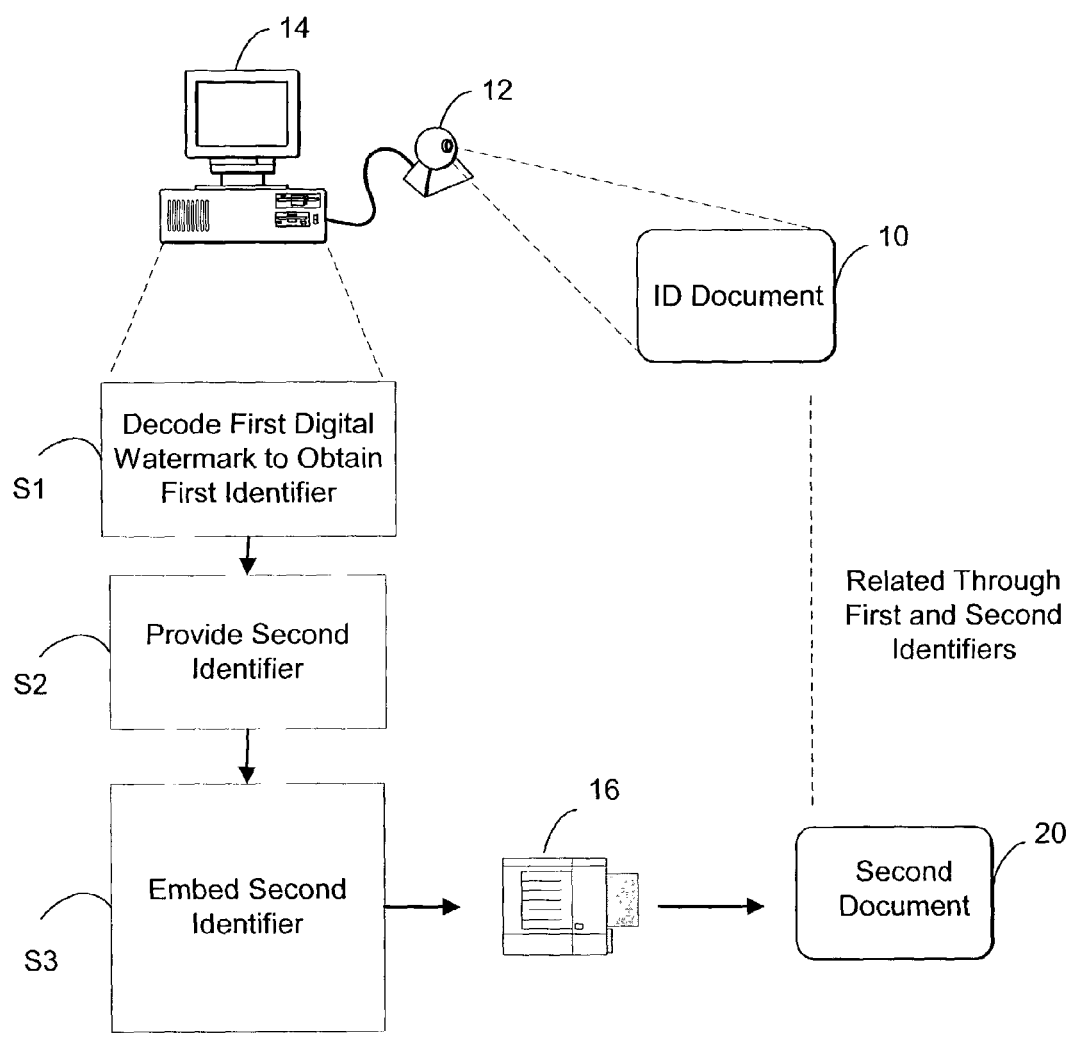
FIG. 1 is a diagram illustrating document linking with digital watermarking.

With reference to FIG. 1, the bearer presents the identification document 10 to a document issuer as is customary, e.g., at an airline check-in counter. An input device 12 captures an image of the identification document 10. Input device 12 may include a digital camera, optical sensor, web camera, CCD array, scanner, 2-D bar code reader, etc. The captured imagery is communicated to a computing device 14. We note that while input device 12 is illustrated as being physically tethered to the computing device 14, the present invention is not so limited. Instead, input device 12 may wirelessly communicate with computer device 14. Of course input device 12 may communicate with computing device 14 through a network such as the internet, LAN, WAN, etc. Or input device 12 may store captured imagery to a disk or flash memory card, which can be read by computing device 14. Computer device 14 may take a variety of forms, including a general purpose computer, hand held device, scanning pen, 2-D bar code reader, network computer, distributed computers, etc. Computing device 14 preferably includes system memory and electronic processing circuitry (e.g., CPU). The processing circuitry communicates with the system memory via a system bus.

A digital watermark detector analyzes the captured imagery to detect and decode the first digital watermark. The digital watermark detector typically includes software instructions that reside in the computing device's 14 system memory. The software instructions execute on the electronic processing circuitry. The digital watermark detector decodes the first digital watermark to obtain the identifier (step S1). For clarity, we refer to the decoded digital watermark identifier as a "first identifier."

A second identifier is provided (step S2). This second identifier will be embedded in a second document as a second digital watermark component. The second identifier can be provided in a number of ways. Yet, regardless of the providing technique, the first and second identifiers are preferably related. In one implementation, the second identifier is a copy of the first identifier. But to prevent someone from merely copying the first watermark identifier from the ID document to some fake second document, it is useful to alter the first identifier in some way that maintains a relationship between the two documents but does not yield the same watermark identifier.

The alteration may include a cryptographic permutation of the first identifier. The second identifier then comprises this permutation. Or the alternation may include setting an identifier bit(s) to indicate that the second identifier is a child of the first identifier. Still further, the alternation may include adding additional data to the first identifier and then embedding the augmented first identifier as the second identifier. Still further, the second identifier may be randomly or pseudo-randomly chosen. A database or data record can be used to associate the randomly (or pseudo-randomly) chosen second identifier with the first identifier.

In other cases, the first identifier includes a first set of information and the second identifier includes a second set of information. The first and second sets are preferably related. For example, the first set may include a key that unlocks, decrypts or otherwise decodes the second set. Or the first set may include some personal data (e.g., bearer's first name) while the second set includes related personal data (e.g., bearer's last name).

The second identifier is embedded in a second document 20 (step S3). The second document 20 may include a boarding pass, transportation ticket, baggage tag or receipt, event ticket, printed document, envelope, invitation, security badge, etc., etc. The second document 20 is printed with a printer 16. (We note that in an alternative, but related implementation, the second document can be retained in electronic form. The electronic form includes the digital watermark. The embedded electronic form can be transferred to, e.g., a handheld device for later verification.).

It should be appreciated that the present invention is not limited to having the embedding step S3 carried out by computing device 14. Indeed, once obtained the second identifier can be embedded by another computing device, which communicates the embedded information to printer 16. Also, many of today's printers include sophisticated computing capability, so printer 16 could alternatively carry out embedding step S3. Additionally, a device other than computing device 14 can carry out the provision of a second identifier (i.e., step S2).

The identification document 10 and second document 20 are linked through the two digital watermark identifiers. In particular, the identification document's 10 first identifier and the second document's 20 second identifier are related (also referred to as "linked"). Such a relationship enables an additional layer of verification when the bearer presents the identification document 10 and the second document 20, e.g., to board a plane, access a secure location, etc., etc.

Figure 2:
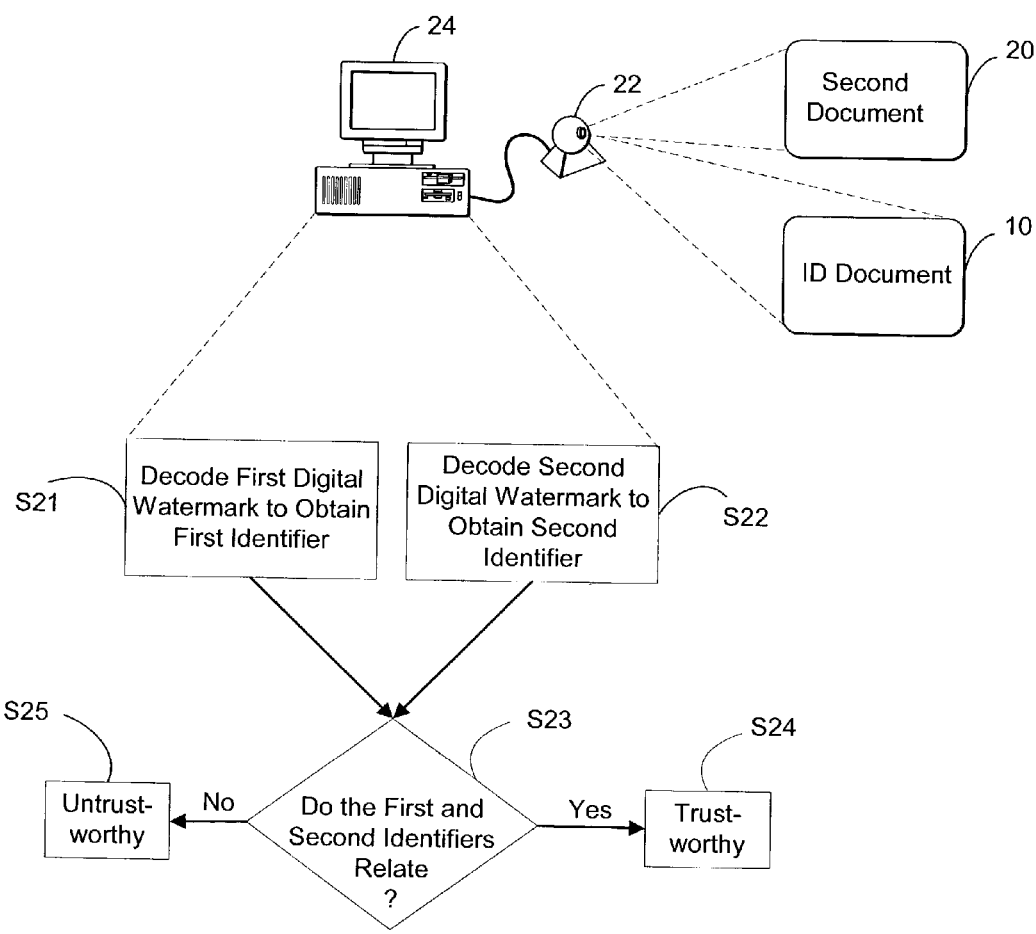
FIG. 2 is a diagram illustrating an authentication process for documents linked according to the FIG. 1 process.

With reference to FIG. 2, the bearer presents the identification document 10 and the second document 20 to an input device 22. The input device 22 may be located at a boarding gate, secured access point, event entrance, etc. The captured imagery is communicated to a computing device 24. The computing device 24 includes a digital watermark detector. The digital watermark detector decodes the first and second digital watermarks embedding in the captured imagery of documents 10 and 20 to obtain the first and second identifiers (steps S21 and S22). The order of the presentment and decoding is not critical, unless one of the identifiers is used to decode, find or decrypt the other identifier. The computing device 24 (e.g., via software executing on computer device 24) determines whether the first and second identifiers relate or otherwise coincide (step S23). For example, the various identifier relationships or alterations discussed above can be explored. The second document is considered trustworthy when the two identifiers are related (step S24). Otherwise, the second document is considered untrustworthy (step S25).

Our inventive concepts apply to other forms of printable secure indicia, like some types of bar codes and scrambled indicia. For example, the identification document may include an embedded digital watermark identifier, but the second document includes a second identifier in the form of a secure 2-D bar code. We can even extend this to other machine-readable codes, but these codes should be readable from the identification document and then be writable to the second document that is issued. Some examples include magnetic strip readers and writers, smart cards, etc. We note, however, that the inherent characteristics of a digital watermark make the digital watermark a much-preferred solution.

Our inventive system and methods for linking documents also provide a solution for home printing of say tickets and boarding passes. For example, a user presents her photo ID to a home computer. A first digital watermark identifier is extracted from the photo ID, perhaps altered and is then embedded as a second identifier in tickets printed on a home printer. The embedded ticket is then verified at an airport gate using the FIG. 2 method.

It should be appreciated that this aspect of the present invention applies to many other types of documents. For example, consider an office setting where related papers or charts are linked. Or a receipt can be linked to a credit card that is used for a purchase evidenced by the receipt. Still further, medical records can be linked to insurance cards or patient ID tags (or wristbands). Or newborn baby arm tags can be linked to tags worn by their mother and father. Traveler's checks can be linked to a bearer's documentation. The possibilities are many.

Multiple Watermark Components

There are many situations in which a document is subjected to multiple printing stages, using perhaps different printing processes or printers. Consider a birth certificate for example. A birth certificate is initially printed using a high quality printing process (e.g., an offset printing process or dye diffusion printing process, silk screening, lithography, ink jet, flexography, letter press, etc., etc.). This initial printing process prints so-called "fixed" information, like generic text, designs, lines, state seal, etc. This type of printing can be labor intensive and expensive. Yet this high quality printing provides a favorable channel for embedding a robust digital watermark component.

The birth certificate is later printed with so-called "variable" information, like a baby's name, date and location of birth, etc. This variable information personalizes the birth certificate to a new child. A relatively low quality printing process (e.g., laser jet or ink jet printer, etc.) typically carries out this second printing. This low quality printing process may not always be conducive to robust watermark embedding.

One aspect of the present invention provides a watermark embedding technique that capitalizes on these different types of printing environments—a high quality printing process and a low quality, but perhaps faster, printing process. In particular, a first digital watermark component is embedded during an initial printing stage, while a second digital watermark component is embedded during a later printing stage.

Figure 3:
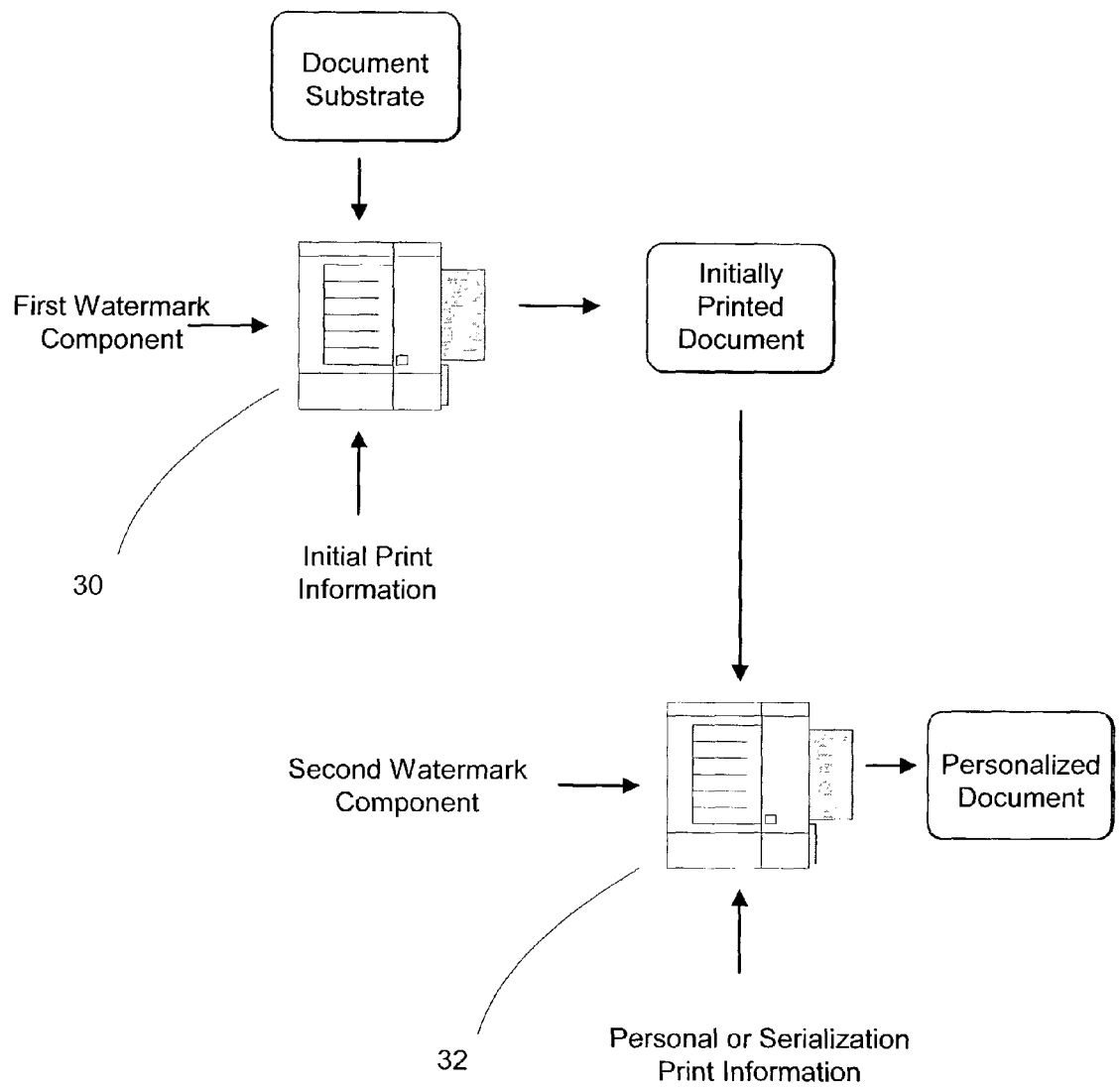
FIG. 3 is a diagram illustrating multi-stage printing and watermark embedding.

Consider FIG. 3. A high quality printing process 30 is used to initially print a document substrate. Although not separately illustrated, printing process 30 may include both a computing device and a printing device or process. Printing process 30 receives as inputs initial print information and a first digital watermark component. We note that in some implementations the first digital watermark is embedded in the initial print information (or an image of such), and the embedded initial print information is provided to printing process 30. Printing process 30 applies the initial print information and the first digital watermark component to the document substrate. As discussed above, this initial printing stage is typically used to print fixed information, artwork and/or designs on the document substrate.

The initially printed document is subjected to a later printing process 32. Although not separately illustrated, printing process 32 may include both a computing device and a printing device or process. The printing process 32 receives as inputs personal information (e.g., so-called variable information) and a second digital watermark component. Of course, the second digital watermark component can be embedded in the personal information (or an image of such), and the embedded personal information is then provided to the later printing process 32. The printing process 32 applies the personal information and the second digital watermark component to the initially printed document to produce a personalized document.

We now provide digital watermark component details for each of the initial printing stage (e.g., printing process 30) and the later printing stage (e.g., printing process 32).

Initial Printing Stage

In a first implementation a first digital watermark component includes a so-called grid or orientation component (see, e.g., assignee's patent application Ser. Nos. 10/154,621 (now published as US 2002-0145759 A1) and Ser. No. 09/503,881). An orientation component is helpful in resolving image distortion such as rotation, scale and translation. Proper image orientation is sometimes helpful when decoding a watermark payload or message. In some cases the orientation component identifies an image reference point or origin. A watermark detector may use the reference point or origin to improve message or payload detection.

In another implementation, the first digital watermark component includes an identifier. The identifier may be in the form of an embedded payload, message bit(s) or may even be reflected by a type or format of an orientation component. The identifier can carry information such as fixed information that is printed on the document. Or the identifier may include information such as a batch run number, printer location, identification number, expected distribution channel, etc. The identifier alternatively may indicate the type of document in which it is embedded in, e.g., signaling that a document is an identification document or boarding pass.

The identifier may also carry information that provides decoding clues to help resolve a second digital watermark component. In one case the clue points to where the second digital watermark should be located or embedded in the document. (E.g., consider an identification document in which the clue indicates that the second digital watermark is embedded in a photograph or region with a variance or local contrast level above a certain threshold.). In another case a clue provides a decryption or decoding key for decrypting or decoding the second digital watermark. In still another case the clue indicates which message protocol is used for forming or embedding the second digital watermark component.

The identifier may also signal to a watermark detector that the document is embedded with a second digital watermark component. This may encourage the watermark detector to continue searching for the second digital watermark component. This aspect of the present invention may also be used for authentication purposes. For example, consider a batch of identification documents (or document substrates) that are misappropriated after initial printing, but before personalization. The initial printing embeds a first digital watermark component including an identifier. The identifier carries information indicating that a second digital watermark component is expected. An authentication process then requires detection and successful decoding of the second digital watermark component before the identification document is considered trusted. In the case of a misappropriated identification document, a forgery process used to personalize the misappropriated identification document may not include a second digital watermark component, or if it does include such a component, it might not properly relate to the identifier's clue.

The identifier may also include a pointer or link to a data record. The pointer may be used as an index to interrogate a database to retrieve the data record. The data record includes information regarding the type of watermark embedding, the type of document in which the pointer is embedded, and/or characteristics regarding the second digital watermark. The data record may also include tell-tale signs about the document or second watermark component embedding, e.g., like image locations, areas of high noise, document areas unlikely to include a watermark signal, watermark message protocol, etc. The second watermark detector can use these tell-tale signs to help refine the search for the second digital watermark component.

In still another implementation, the first digital watermark component includes both an identifier and an orientation component.

Second Printing Stage

After first component embedding and initial printing, the document is subjected to second or later printing. A likely scenario is that a batch of documents is initially printed and then provided to a document issuer (e.g., like a DMV, state records office, company, etc.). The document issuer personalizes a document to correspond to an individual. Or the document is serialized for identification. The personalization usually takes the form of printing names, addresses, social security numbers, photographs and/or biometric information (e.g., fingerprint), etc., etc. We capitalize on this second printing stage to embed a second digital watermark component. While we imagine that the second digital watermark component will most frequently be located in document region where the second, personalized printing occurs, the present invention is not so limited. Indeed, the second printing can also reprint areas of the document that have been initially printed to embed the second digital watermark component.

In one implementation, the second digital watermark component includes a message or payload. The payload will often reflect personalized information, e.g., corresponding to the printed variable information or to a serialization scheme. In the case of embedding variable information, the second digital watermark can be read and compared against the printed variable information to determine whether the document is authentic, or whether the document's printed variable information may have been altered. The payload may also include information that is related to the first digital watermark component. The relationship may be a cryptographic permutation, subset of information, related identifiers, decoding or decryption keys, etc.

In another implementation, detection of the second digital watermark component is improved when the first digital watermark component includes an orientation component. The orientation component is determined to help locate the second digital watermark component. The orientation component may also be helpful in resolving image distortion issues. There may be issues of registration with this implementation— meaning that the second digital watermark component should be properly aligned and embedded on the document to take advantage of the first digital watermark component's orientation clues. There are many possible registration techniques. For example, in some card and ID document printers, the printer physically aligns the card to receive printing. The physical orientation of the card can be relied upon to provide appropriate alignment for the second printing. Or the physical alignment can be taken into consideration by a watermark embedder, to adjust for the physical alignment if needed. Another technique uses fiducials or alignment marks that are initially printed on a document surface. Optical sensors capture an image of the document. The captured image is then analyzed by pattern recognition software to detect the fiducials. The printing/embedding or the document's alignment can be adjusted based on the detection characteristics, if needed. Still another technique uses the orientation clues provided by the first digital watermark orientation component to help align the printing/embedding or document position. (Depending on the printing resolution, we note that registration may not be an issue. For example, signals embedded at low-resolution do not need terribly tight registration.).

Utilizing an aspect of the present invention which separates an orientation component and a payload component, a large, high-quality expensive print run of the document can be performed, and then with a lower quality non-expensive printer, an image with a variable payload is printed in a selected area of the document without detracting from the aesthetics created by the high quality printing.

In another implementation, the second digital watermark component includes both an orientation component and a payload or identifier component.

In still another implementation, a document receives more than two digital watermark components. The additional digital watermark components can be printed at still additional printing stages.

While the examples above have offered a few types of documents that may benefit from our techniques, we note that the present invention is not so limited. Indeed, traveler's checks, checks, banknotes, security documents, certificates of authenticity, stock certificates, etc., and other documents that are subjected to multiple printing stages can benefit from our techniques.

In yet another implementation, the second digital watermark component comprises a fragile digital watermark component. The fragile component is designed to be lost or to predictably degrade upon some signal processing, like scanning and printing, copying, compression, etc.

Advantages

There are many advantages to our dual-stage embedding where a first watermark component is embedded with a first printing process, and a second watermark component is embedded with a second printing process. One advantage is that the first component may be more robust, since it is often printed with higher quality techniques. Also, in some cases an extensive, high-quality printing run may be less onerous if each of the printed documents includes the same watermark component (e.g., same orientation component or same identifier). Serialization or personalized embedding can occur at a later time, on a document-by-document basis. Another advantage is that in some cases the dual watermark components can be used to buttress the security of a document, e.g., by relating the two components in some fashion. Of course there are other advantages that are apparent from the above detailed description.

Concluding Remarks

Having described and illustrated the principles of the invention with reference to specific implementations, it will be recognized that the principles thereof can be implemented in many other, different forms. To provide a comprehensive disclosure without unduly lengthening the specification, applicants incorporate by reference the patents and patent applications referenced above.

We note that the discussion regarding input device 12 and computing device 14 can be applied to input device 22 and computing device 24 as well. Also, instead of a software implementation, a digital watermark detector can be implemented with a hardware or hardware/software implementation.

The section headings in this document are provided for the reader's convenience and are not intended to limit the invention. Disclosure found under one section heading can be readily combined with disclosure found under another section heading.

In some of the above-described implementations, the first digital watermark component and the second digital watermark component are separate and distinct watermarks. Each component may be embedded using the same or different watermarking protocol and message format.

The particular combinations of elements and features in the above-detailed embodiments are exemplary only; the interchanging and substitution of these teachings with other teachings in this and the incorporated-by-reference patents/applications are expressly contemplated.

What is claimed is:

1. A method of applying serialized data to a document, said method comprising:
   providing a first digital watermark component including orientation information;
   embedding the first digital watermark component in first print data, and applying the embedded first print data to a document using a first printing process;
   providing a second digital watermark component including a payload; and
   embedding the second digital watermark component in second print data, and applying the embedded second print data to the document using a second printing process, wherein the first printing process and the second printing process are separate printing processes.

2. The method of claim 1, wherein the first print process provides relatively higher printing quality as compared to the second printing process.

3. The method of claim 1, wherein the payload comprises information that is unique to a bearer of the document.

4. The method of claim 1, wherein the payload comprises serialization information that uniquely identifies the document.

5. The method of claim 1, wherein the first digital watermark component further comprises an identifier.

6. The method of claim 5, wherein the identifier and the payload are related.

7. The method of claim 1, wherein the embedded second print data printed on the document is in alignment with the embedded first print data as printed on the document, whereby the second digital watermark component can be read from the document by first detecting the orientation information and using the orientation information to help decode the second digital watermark component.

8. A method of digitally watermarking a document that is to receive printing during at least a first printing stage and during a second printing stage, wherein the first printing stage and the second printing stage are separate printing stages, and wherein the first printing stage applies fixed information to the document and the second printing stage applies personalized information to the document, said method comprising:
   providing a first digital watermark component;
   embedding the first digital watermark component in the fixed information, and applying the embedded fixed information to the document during the first printing stage;
   providing a second digital watermark component; and
   embedding the second digital watermark component in the personalized information, and applying the embedded personalized information to the document during the second printing stage.

9. The method of claim 8, wherein the first digital watermark comprises an indication that a second digital watermark component is embedded in the document.

10. The method of claim 8, wherein the first digital watermark component comprises a decryption or decoding key to decrypt or decode the second digital watermark component.

11. The method of claim 8, wherein the first digital watermark component comprises information pertaining to the embedding location or watermark protocol of the second digital watermark component.

12. The method of claim 8, wherein the first digital watermark component comprises a link to a data record, the data record comprising information pertaining to at least one of a type of document, a watermark embedding, and document areas including a low probability of including watermark information.

13. The method of claim 8, wherein the second digital watermark component comprises information that personalizes the document.

14. The method of claim 8, wherein the second digital watermark component comprises information that serializes the document.

15. The method of claim 8, wherein the first printing stage utilizes a relatively high quality printing process when compared to the second printing stage.

16. The method of claim 8, wherein the second printing stage utilizes a relatively fast printing process when compared to the first printing stage.

17. The method of claim 8 wherein the first digital watermark component comprises orientation information, and the second stage printing is printed in alignment with the first stage printing so that detection of the second digital watermark component can rely on the orientation information.

18. A method of digitally watermarking a printed document comprising:
   receiving a printed document, the printed document comprising a first digital watermark component embedded in first printed indicia on the document, the first printed indicia being printed during a first printing stage;
   providing a second digital watermark component, the second digital watermark component comprising plural-bit data that is unique to the printed document or to a bearer of the printed document;
   embedding the second digital watermark component in second indicia;
   printing the embedded second indicia on the printed document during a second printing stage, the first printing stage and second printing stage comprising different printing stages.

19. The method of claim 18, wherein the first digital watermark component comprises an orientation component.

20. The method of claim 18, wherein the first digital watermark component and the second digital watermark component are related.

21. The method of claim 18, where the plural-bit data comprises a document number.

22. The method of claim 18, wherein the plural-bit data comprises data to uniquely identify the bearer.

23. The method of claim 18, wherein the first digital watermark component comprises an orientation component, the orientation component being useful in decoding the second digital watermark component.

24. The method of claim 19, wherein the first digital watermark component further comprises plural-bit data.

25. A method of marking a physical object with a machine-readable code comprising:
   receiving a physical object, the object comprising first encoding thereon, the first encoding being provided on the object during a first marking stage;
   receiving second encoding, the second encoding comprising plural-bit data that is uniquely related to the object or to a bearer of the object; and
   marking the object to include the second encoding during a second marking stage, wherein the first encoding and second encoding cooperate to convey a machine-readable code, and wherein the first marking stage and second marking stage comprise separate marking stages.

26. The method of claim 25 wherein the first encoding and second encoding each comprise steganographic encoding.

27. The method of claim 25 wherein at least one of the first encoding and second encoding comprises digital watermarking.

28. The method of claim 25 wherein at least the first encoding comprises an orientation or registration component.

29. The method of claim 25, wherein the marking is provided with printing.

30. The method of claim 25 further comprising aligning or registering the second encoding according to the first encoding.

* * * * *